United States Patent Office 2,731,451
Patented Jan. 17, 1956

2,731,451

METHOD OF PREPARING A COPOLYMER OF 2-CHLOROACRYLAMIDE AND METHACRYLONITRILE

John A. Price, Stamford, Conn., assignor to American Cyanamid Company, New York, N. Y., a corporation of Maine No Drawing. Application December 12, 1951, Serial No. 261,377

1 Claim. (Cl. 260—85.5)

This invention relates to the production of new materials having valuable and characteristic properties that make them especially suitable for use in industry, for example in molding, casting, coating, electrically insulating and adhesive applications, and for other purposes. More particularly the invention is concerned with polymerizable compositions comprising a mixture of copolymerizable monomers consisting of, by weight, from 2% (about 2%) to 50% (about 50%), and preferably from 5% (about 5%) to 40% (about 40%), of 2-chloroacrylamide, the formula for which is I 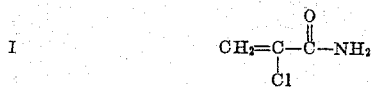

and the remainder an acrylonitrile compound (including mixtures thereof) represented by the general formula II 

where R represents the methyl radical; in other words, Formula II represents methacrylonitrile. The invention claimed herein is directed to a particular method of preparing a specific copolymer of 2-chloroacrylamide and methacrylonitrile.

Various copolymers of acrylonitrile and of methacrylonitrile with other monomers were known prior to my invention. It also was suggested that copolymers of acrylic or alpha-substituted acrylic acids with their amides, including 2-chloroacrylamide (also known as alpha-chloroacrylamide), could be prepared. However, to the best of my knowledge and belief it was not known or suggested prior to my invention that new and useful copolymers of methacrylonitrile and 2-chloroacrylamide could be prepared as briefly described in the first paragraph of this specification and more fully hereinafter. Likewise, to the best of my knowledge and belief it was unknown that the incorporation of 2-chloroacrylamide into methacrylonitrile polymerization product would impart to such a product certain valuable properties hereinafter described.

It is a primary object of the present invention to prepare a new class of copolymers or interpolymers for use in industry.

Another object of the invention is to improve the usefulness of 2-chloroacrylamide whereby its field of utility is enhanced.

Still another and important object of the invention is the production of methacrylonitrile copolymers which have greater thermal stability than many of the other copolymers of this general type or kind.

Other objects of the invention will be apparent to those skilled in the art from the description and examples which follow.

The foregoing objects are attained by copolymerization of a mixture of copolymerizable monomers consisting of, by weight, from about 2% to about 50%, preferably from about 5% to about 40%, of 2-chloroacrylamide and the remainder a compound of the kind embraced by Formula II (that is, from about 50–60% to 95–98% of methacrylonitrile). Heat, light or heat and light can be used to effect or to accelerate polymerization of the mixture of comonomers, although under such conditions the rate of polymerization may be relatively slow. Hence, it is usually preferred to accelerate the polymerization by employing a polymerization catalyst accompanied by heat, light or heat and light. Ultraviolet light is more effective than ordinary light.

Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide and of other catalysts that can be employed are given in Drechsel and Padbury Patent No. 2,550,652 dated April 24, 1951.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the monomer or mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used. The copolymer can be separated from the liquid medium in which copolymerization was effected by any suitable means, e. g., by filtration, centrifuging, solvent extraction, etc.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending, for example, upon the particular mixture of monomers employed, the particular catalyst, if any, used, the rapidity of polymerization wanted, and other influencing factors.

In order that those skilled in the art may better understand how the present invention can be carried into effect, the following example is given by way of illustration and not by way of limitation. All parts and percentages are by weight.

Example 1

To a reaction vessel equipped with a reflux condenser are added 7.5 parts of methacrylonitrile, 2.5 parts of 2-chloroacrylamide, 240 parts of water and 0.2 part of potassium persulfate. The resulting solution is heated on a steam bath for 4 hours. The copolymer of methacrylonitrile and 2-chloroacrylamide thereby produced is filtered off and dried. It is obtained in a yield amounting to 8 parts.

The copolymers obtained by practicing this invention have numerous applications in the plastics and coating arts, especially where thermoplastic methacrylonitrile copolymers having good thermal stability under heat are desired. This is evidenced, for example, by their resistance to discoloration when heated at an elevated temperature, e. g., at 120°–150° C. With or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

Copolymers of methacrylonitrile and 2-chloroacrylamide that contain the higher percentages of the latter compound, e. g., 45–50% by weight of 2-chloroacrylamide, also tend to have improved flame resistance as compared with the usual methacrylonitrile copolymers because of the combination of chlorine and amide nitrogen in the 2-chloroacrylamide component of the copolymer. Hence such copolymers are valuable in fields of utility for which the conventional non-halogen-containing copolymers are unsuitable.

The polymerizable compositions described herein can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers produced by the method of the present invention, especially those containing from 2 to 20% by weight of 2-chloroacrylamide, in the manner described in, for example, Patents 2,558,730, -1, -2 and -3.

The polymerizable compositions and polymerization products described herein have numerous other uses, for example uses such as are given in the aforementioned Drechsel and Padbury Patent No. 2,550,652 with particular reference to polymerizable and polymerized compositions produced from diallyl cyanamide.

I claim:

The method of preparing a copolymer of 2-chloroacrylamide and methacrylonitrile which comprises heating together under reflux for four hours a mixture of 7.5 parts of methacrylonitrile, 2.5 parts of 2-chloroacrylamide, 240 parts of water and 0.2 part of potassium persulfate, and isolating the copolymer of methacrylonitrile and 2-chloroacrylamide thereby produced from the reaction means.

References Cited in the file of this patent

UNITED STATES PATENTS

| | | |
|---|---|---|
| 2,456,360 | Arnold | Dec. 14, 1948 |
| 2,486,241 | Arnold | Oct. 25, 1949 |
| 2,656,341 | D'Alelio | Oct. 20, 1953 |